United States Patent [19]

Segal

[11] Patent Number: 4,790,342

[45] Date of Patent: Dec. 13, 1988

[54] FIRE HYDRANT VALVE ACTUATOR

[76] Inventor: Milton Segal, Apt. 212E Park Towne Pl. - 22nd & The Parkway, Philadelphia, Pa. 19130

[21] Appl. No.: 126,359

[22] Filed: Nov. 30, 1987

[51] Int. Cl.[4] .................. F16K 17/40; F16K 43/00
[52] U.S. Cl. ................... 137/68.1; 137/305; 137/315; 137/797; 251/291
[58] Field of Search ............ 137/272, 281, 291, 294, 137/296, 304, 305, 307, 308, 68.1, 315, 797; 251/291

[56] References Cited

U.S. PATENT DOCUMENTS

| 53,736 | 4/1866 | Frailey | 137/291 |
|---|---|---|---|
| 94,749 | 9/1869 | Holly | 137/305 |
| 154,087 | 8/1874 | Roberts | 137/307 |
| 163,425 | 5/1875 | Vergnes | 137/305 |
| 694,180 | 2/1902 | O'Brien | 137/305 |
| 990,990 | 5/1911 | Knickerbacker | 137/304 |
| 1,800,010 | 4/1931 | Emerson | 137/797 |
| 2,017,600 | 10/1935 | Lofton | 137/315 |
| 2,171,078 | 8/1939 | Cline | 137/797 |
| 2,249,848 | 7/1941 | O'Brien | 137/797 |
| 2,687,141 | 8/1954 | Baker | 251/291 |
| 2,739,612 | 3/1956 | Hansen | 251/291 |
| 2,980,125 | 4/1961 | Grant et al. | 137/68.1 |
| 3,002,775 | 10/1961 | Mueller et al. | 137/68.1 |
| 3,104,554 | 9/1963 | Mueller et al. | 137/68.1 |
| 3,331,397 | 7/1967 | Mueller et al. | 137/797 |
| 3,439,938 | 4/1969 | Dunton | 137/68.1 |
| 3,453,897 | 7/1969 | Adinolfi | 74/89.15 |
| 3,532,108 | 10/1970 | Sullivan | 137/296 |
| 3,532,109 | 10/1970 | Smith | 137/296 |
| 3,961,642 | 6/1976 | Thomas et al. | 137/797 |
| 4,062,375 | 12/1977 | Byrnes | 137/296 |
| 4,139,016 | 2/1979 | Byrnes | 137/296 |
| 4,307,746 | 12/1981 | Rifat | 137/291 |
| 4,390,038 | 6/1983 | Salvato | 137/296 |
| 4,633,896 | 1/1987 | Bainbridge et al. | 137/296 |

Primary Examiner—George L. Walton
Attorney, Agent, or Firm—Stuart E. Beck

[57] ABSTRACT

A fire hydrant comprising an upper portion and a lower portion. The lower portion contains a water inlet valve and an operating rod for selectively opening and closing the valve. The upper portion of the fire hydrant includes a bonnet and collar with apertures in them respectively. The valve is opened and closed by a removable tool which is threaded through an opening in the upper portion of the fire hydrant and engages the operating rod to move it and thereby open the valve.

10 Claims, 2 Drawing Sheets

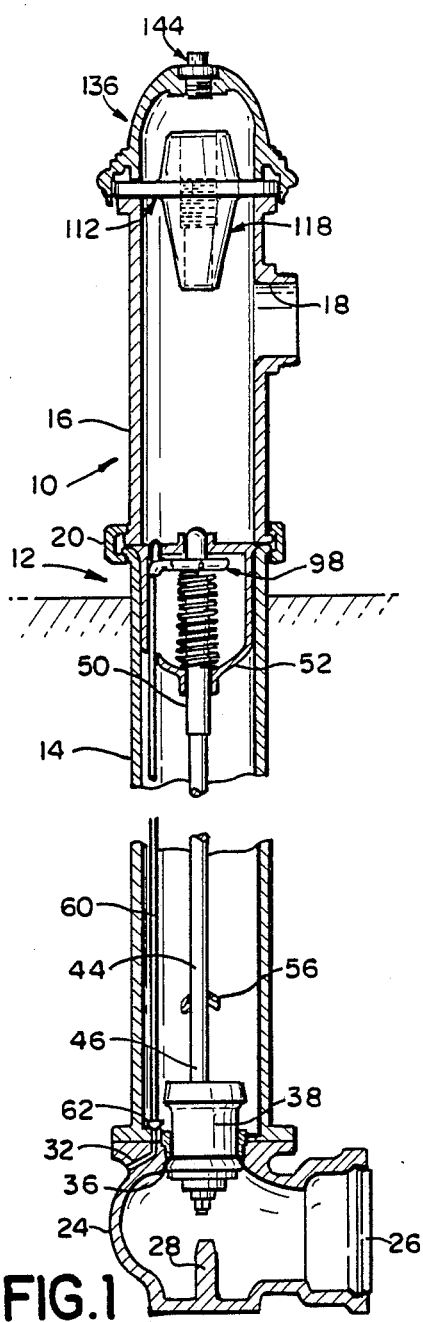
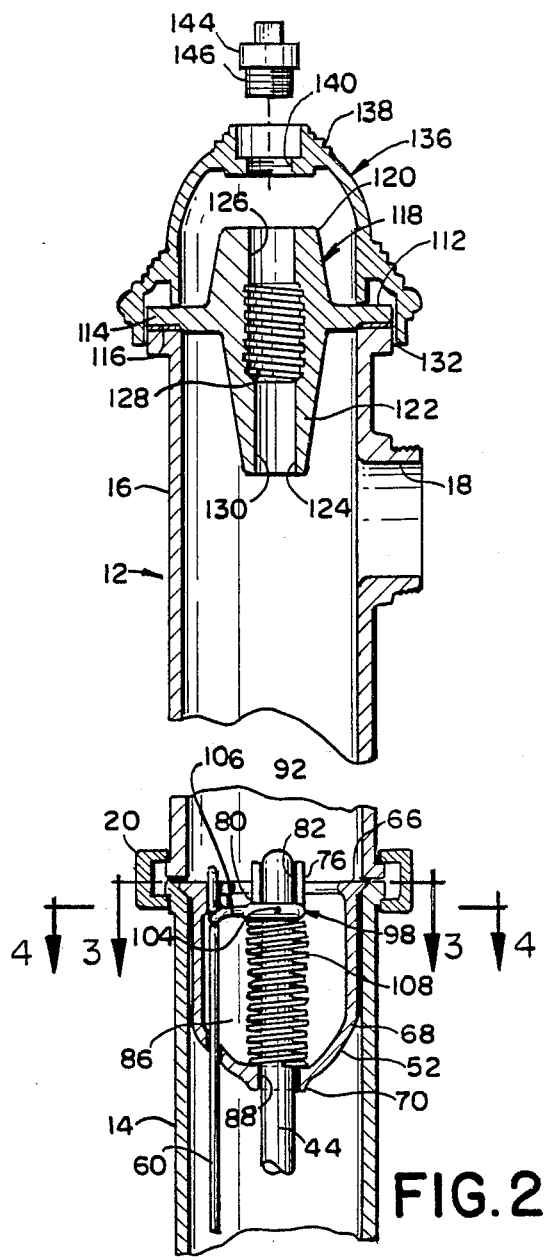
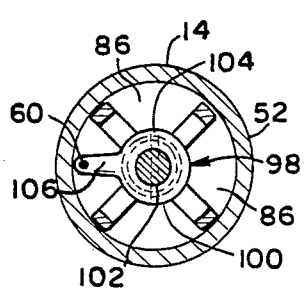
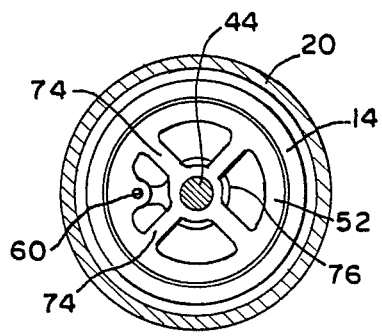
FIG.1
FIG.2
FIG.4
FIG.3

FIRE HYDRANT VALVE ACTUATOR

BACKGROUND OF THE INVENTION

Field Of The Invention

This invention relates to a fire hydrants and more particularly to fire hydrants which can be operated only by the use of a special tool.

It is well-known that modern fire hydrants are vulnerable to being opened by unauthorized persons. The opening of these hydrants results in diminution in water pressure throughout the city system, especially in summer, to the extent that fire fighting capability may be severely reduced.

Additionally, open fire hydrants cause a drain on municipal water systems to the extent that they may have a substantial effect on the availability of water for normal purposes.

Attempts to design secure fire hydrants have resulted in designs that include locking systems. While for the most part they achieve their intended results, they are deficient in that they are susceptible to damage when the fire hydrant in which they are installed is damaged as for example, when it is sheard off at its base by a vehicle.

The resulting damage requires that the upper part of the fire hydrant be replaced along with the installed locking system. Since many of these systems include numerous parts, the cost of repair is substantial.

It would be desirable to have a fire hydrant which can only be opened by authorized personnel using a special tool. Preferably, such a fire hydrant should be made of a minimum amount of parts and should be constructed so that the tool must remain in the fire hydrant when it is opened. This latter feature would have the advantage of enabling the police or fire department to retrieve the tool when an opened fire hydrant is called to their attention.

Further, it would be advantageous if such a fire hydrant were constructed so that should it be damaged as when for example, it is struck by a vehicle, only a minimum number of parts would require replacement.

SUMMARY OF THE INVENTION

Briefly, the invention relates to a fire hydrant which has an inlet valve in its lower portion which is connected to a first operating rod. The first operating rod is in the lower portion of the fire hydrant. A second operating rod which is insertable into the fire hydrant engages the first operating rod to open the inlet valve. When the second operating rod is removed from the fire hydrant, the inlet valve is closed.

The invention also relates to a tool for a fire hydrant that comprises an elongated member having an intermediate portion that is threaded to be received by complementary threads on a fire hydrant and a lower portion for engaging the operating rod of the water inlet valve for the fire hydrant.

BRIEF DESCRIPTION OF THE DRAWING

The invention will be better understood and further advantages and uses thereof will be readily apparent when considered in view of the following detailed description of an exemplary embodiment, taken with the accompanying drawing in which:

FIG. 1 is a side elevation view, partially in section of a fire hydrant constructed in accordance with a presently preferred embodiment of the invention.

FIG. 2 is an enlargement of a portion of the fire hydrant illustrated in FIG. 1.

FIG. 3 is a sectional view taken along lines 3—3 of FIG. 2.

FIG. 4 is a sectional view taken along lines 4—4 of FIG. 2.

DESCRIPTION OF THE PREFERRED EMBODIMENT

Figures 5, 6, 7:
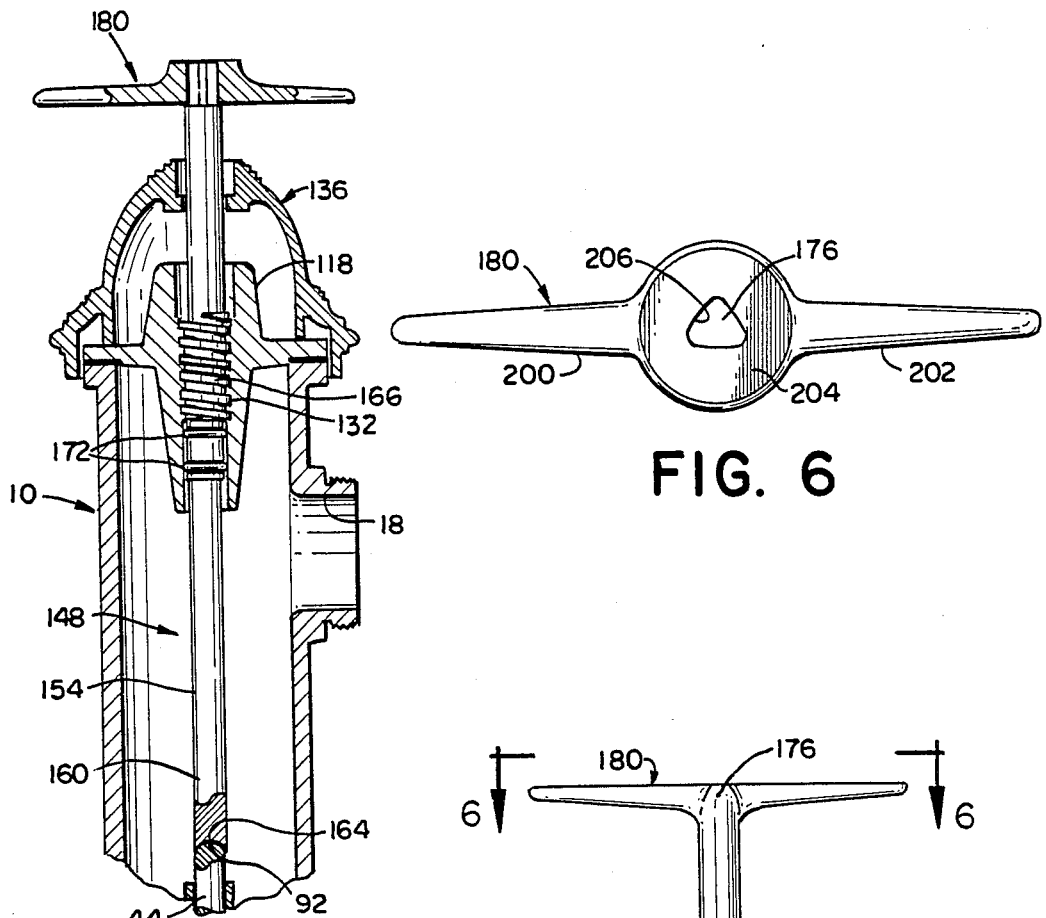
FIG. 5 is a view of a presently preferred embodiment of a tool used to open and close the fire hydrant illustrated in FIG. 1.
FIG. 6 is a sectional view taken along lines 6—6 of FIG. 5.
FIG. 7 is a side elevation view, partially in section, of a fire hydrant with a tool constructed in accordance with a presently preferred embodiment of the invention.

Referring to FIG. 1, a fire hydrant 10 is seen as comprising a housing comprising a lower cylindrical portion 14 and an upper cylindrical portion 16.

A suitable water outlet opening 18 is provided in the upper cylindrical portion 16 of the fire hydrant.

The upper and lower cylindrical portions are connected to each other in abutting relation by a suitable seal (not shown) and collar 20.

The fire hydrant is installed at a site with its lower cylindrical portion 14 inbedded in the ground or sidewalk. Only its upper end is exposed. Thus, the upper cylindrical portion 16 can be replaced by removing collar 20, substituting a new portion 16 and then replacing the collar 20.

The lower end of lower cylindrical portion 14 is connected to an inlet housing which includes a water inlet opening 26. The water inlet opening includes a valve stop 28 and a drain opening 32. The drain opening may also extend through a portion of an inwardly directed flange at the bottom of lower portion 14.

The inlet housing 24 defines a valve seat 36. A water inlet valve body 38 which is shown in contact with valve seat 36 in its closed position is mounted for movement between that position and its downward position where it may bear against stop 28. In its downward position the valve body 38 permits water to flow through inlet opening 26 into the housing defined by upper and lower cylindrical portions 14 and 16.

Movement of valve body 38 is controlled by a first operating rod 44 which is connected at its lower end 46 to the valve body 38. The upper end 50 of first operating rod 44 is connected to a suitable support means such as second housing 52 which is supported in the lower portion of the chamber, preferably below the juncture of the lower cylindrical portion 14 and upper cylindrical portion 16 of the first housing 12.

A suitable guide 56 may be mounted on the interior wall of the lower cylindrical portion 14 to reduce the likelihood of the first operating rod buckling as it reciprocates between its opened and closed positions.

A control rod 60 which is connected at its upper end for movement with the first operating rod 44 extends through the lower cylindrical portion 14 of the fire hydrant. Its lower end functions as a closure for drain opening 32.

As best seen in FIGS. 2, 3 and 4, the second housing 52 may be generally basket-shaped in that it may have an upper wall 66 and a depending side wall 68 that merges into a lower wall 70. The upper wall 66 is supported by the side wall 68. The upper wall includes a plurality of radially extending spokes 74 (FIG. 3) which extend between the outer portion of upper wall 66 and a centrally located and downwardly depending collar 76 which defines an opening 82. The side walls 68 of second housing 52 are provided with a plurality of water passage slots 86. The lower wall 70 includes an opening 88.

The upper portion of first operating rod 44 extends through openings 82 and 88. Its upper distal end 92 may be rounded or tapered so as to be generally convex.

A retaining bracket 98 which includes a ring 100 having an opening 102 is disposed in second housing 52. The upper distal end 92 of operating rod 44 is received through the opening 102. The bracket 98 is fixed to the upper distal end 92 by a suitable pin or set screw 104.

The retaining bracket 98 includes a laterally extending arm 106 which supports and is fixed to the upper end of control rod 60.

Suitable means is provided for urging the valve body 38 to the position shown in FIG. 1 in which it lies against valve seat 36. Preferably, such urging means comprises a coiled compression spring 108 which is disposed between ring 100 and the lower wall 70 of the second housing 52. The spring 108 is normally compressd so that it tends to urge the bracket 98 toward the collar 76 thereby causing the valve 38 to lie against valve seat 36.

The upper cylindrical portion 16 of first housing 12 includes a closure 112 which may be a disk shaped plate having a perimeter which is supported by a suitable flange 116 at the upper end of upper cylindrical portion 16. The closure 112 supports a centrally positioned collar 118 which includes first and second cylindrical portions which extend upwardly and downwardly respectively from plate 112. The collar 118 has an inner wall 124 which is comprised of an upper part 126, an intermediate part 128 and a lower part 130. Preferably, the upper and lower parts 126 and 130 of inner wall 124 are cylindrical with the mid portion 128 including a suitable thread 132. The closure 112 is secured in position against flange 116 by a bonnet 136 as is well-known in the art.

The bonnet 136 includes a dome 138 which has a threaded opening 140. A plug 144 having complementary threads 146 can be threadingly received in opening 144.

As seen in FIG. 5, a tool 148 for opening the fire hydrant is illustrated. Tool 148 comprises a second operating rod 154 which includes an upper portion 156, an intermediate portion 158 and a lower portion 160.

The lower portion 160 may include a recessed end 164 which is adapted to engage the convex distal end 92 of the first operating rod 64.

The intermediate portion of the second operating rod 154 comprises a plurality of threads 166 which are engagable with the threads 132 in collar 118. Disposed below the threads may be suitable liquid seal means such as first and second spaced annular recesses 170 which may receive and support suitable sealing elements such as "O" rings 172. The upper distal end 176 of portion 156 has a generally triangular shape as illustrated in FIG. 6.

A handle 180 comprising two arms 200 and 202 extend from central portion 204 which defines a centrally positioned aperture 206 of a shape which is complementary to the upper distal end 176 is provided.

As seen in FIG. 7 the tool 148 as shown installed in the fire hydrant.

It can be seen that the second operating rod 154 has been slipped through the opening in collar 118 and mutually engagable threads 132 and 166 have engaged each other. Tool 180 engages distal end 176 and is rotated to cause the second operating rod 154 to gradually be lowered in the fire hydrant until its recessed end 164 encounters the upper distal end 92 of the first operating rod 44. Continued rotation of the second operating rod 154 will cause the first operating rod 44 (FIG. 1) to move downwardly against the force of compression spring 108 to move valve body 38 away from valve seat 36 to thereby admit water into the first housing 12. As the first operating rod 44 is moved downwardly, control rod 60 which is fixed to it by bracket 98 also moves downwardly so that its lower end 62 closes the drain opening 32. The water which enters the fire hydrant through inlet opening 26 exits the fire hydrant through outlet opening 18 in a well-known manner.

Water is prevented from leaking through the central opening in collar 118 by "O" rings 172.

To close the fire hydrant, handle 180 is used to rotate the second operating rod 154 to back it out of the collar 118. As the first operating rod 44 is permitted to move upwardly under the force of spring 108, valve body 38 moves against valve seat 36 and the lower end 62 of control rod 60 opens the drain opening 32. The water which remains in the fire hydrant after valve body 38 rests against seat 36 will drain from the fire hydrant through opening 32.

To prevent debris from accumulating in the fire hydrant, plug 144 can be theaded into the opening 140 in the bonnet. Preferably, the head on plug 144 is shaped similarly to the distal end 176 of the upper operating rod 154 so that handle 180 can be used to install it and remove it from opening 140.

The fire hydrant described has substantial advantages over fire hydrants which have been known heretofore. Thus, the principal operating portion of the fire hydrant is disposed in lower cylindrical portion 14. The only portion of the fire hydrant that is subject to loss or damage is the upper cylindrical portion 16, collar 118, bonnet 136 and plug 144. Accordingly, should the upper portion of the fire hydrant is damaged, these items can be replaced in a relatively simple manner; it being recognized that since there are only four pieces the cost of such replacement is relatively inexpensive. Usually, however, fire hydrant damage is confined to the collar 20. The upper portion remains intact after it is separated from the lower portion. Therefore, with the described embodiment, the upper portion can be readily reinstalled with the use of a new collar. By comparison, this repair is not possible on conventional fire hydrants since the operating mechanism must be disassembled to permit replacement of the rods that control the inlet valve and drain valve.

Further, due to the fact that the tool must be in the fire hydrant to open it, officers arriving at an open fire hydrant will be able to retrieve the tool thereby denying the people that opened the fire hydrant the opportunity to reopen the it after the officers have left. On the other hand, if the tool is not in the fire hydrant, then necessarily, the fire hydrant is closed. Therefore, fire hydrants of the type disclosed herein will substantially reduce the incidence of unauthorized opening of fire hydrants.

Thus, while the invention has been described with respect to a particular embodiment, it is apparent that other embodiments can be employed to achieve the intended results. Thus, the scope of the invention should not be limited by the foregoing description, but, rather only by the scope of the claims appended hereto.

In The claims:

I claim:

1. In a fire hydrant of the type including a first housing that defines an internal chamber wherein said housing comprises an upper portion and a lower portion which are connected to each other by a member wherein said lower portion is adapted to be installed in the ground and the upper portion and said member are adapted to be above the ground, a closure for the upper end of the upper portion of said housing, a water inlet valve in the lower portion of said housing, and a water inlet valve operating mechanism which includes means for urging said water inlet valve to its closed position and a first operating rod, the improvement comprising, said means for urging said water inlet valve to its normally closed position being disposed in said lower portion of said housing, said first operating rod being disposed in the lower portion of said housing, one end of said first operating rod being in engagement with said water inlet valve, the other end of said first operating rod being below the connection of said upper and lower portions of said housing, means for supporting said first operating rod for axial movement between a first position where it opens said water inlet valve and a second position where said water inlet valve is closed, the upper portion of said internal housing not containing any part of said valve operating mechanism when said water inlet valve is closed, so that if said upper portion is damaged or broken, there is no damage to said water inlet valve or said valve operating mechanism whereby repair of said hydrant can be made without having to remove or replace said water inlet valve or said valve operating mechanism, an aperture in said closure, said aperture being for receiving a means for moving said first operating rod to open said water inlet valve.

2. A fire hydrant as defined in claim 1 wherein said closure includes a plate, said plate including a perimeter which is supported by said housing in said upper portion of said chamber, a collar, said collar being supported by said plate and including an inner wall, and said inner wall comprises a first cylindrical portion and a second cylindrical portion with one of said cylindrical portions defining one of said mutually engagable means.

3. A fire hydrant as defined in claim 1 including a drain opening in said lower portion of said internal chamber, a closure for said drain opening, and means for connecting said closure for said drain opening to said first operating rod so that said closure opens said drain opening when said water inlet valve is closed to permit liquid to be drained from said internal chamber.

4. A fire hydrant as defined in claim 1 wherein said means for supporting said first operating rod includes a second housing, said second housing including an upper wall and a lower wall, said second housing being supported in said lower portion of said internal chamber, said upper and lower walls including openings through which said first operating rod slidably extends, and said urging means includes a first part in engagement with said second housing and a second part in engagement with said first operating rod.

5. A fire hydrant as defined in claim 4 wherein said means for connecting said closure for said drain opening to said lower operating rod includes an elongated member which has one of its ends connected to said last named closure and its other end connected to said lower operating rod, and said urging means is disposed between said other end and said lower wall.

6. A fire hydrant as defined in claim 1, including means comprising a second operating rod, said second operating rod being selectively receivable in said aperture for engagement with said first operating rod, selectively mutually engageable means on said second operating rod and said closure, said selectively mutually engagable means being operative when engaged to cause said second operating rod to move between a first position where it engages and displaces said first operating rod and water inlet valve to permit water to enter said chamber and a second position where it separates from said first operating rod and inlet valve to prevent water from entering said chamber, and said selectively mutually engageable means being operative when disengaged to selectively permit said second operating rod to be inserted and withdrawn from said aperture in said closure so that said second operating rod can be withdrawn from said chamber when said water inlet valve is closed.

7. A fire hydrant as defined in claim 6 wherein said aperture includes an inner wall, and said mutually engagable means comprises complementary threads on said inner wall of said aperture and on said second operating rod, liquid sealing means, said liquid sealing means being supported by said second operating rod, and said liquid sealing means is engagable with said inner wall of said aperture to prevent liquid from flowing through said aperture.

8. A fire hydrant as defined in claim 6 including a bonnet, said bonnet being coupled to said first housing in overlying relation to said closure, said bonnet including an opening for receiving said second operating rod, and a second closure for said opening in said bonnet, said second closure being selectably insertable in said opening when said second operating rod is removed therefrom.

9. A fire hydrant as defined in claim 6 wherein said first and second operating rods have mutually engaging elements.

10. A fire hydrant as defined in claim 9 wherein one of said mutually engaging elements is a recess that faces the other operating rod and the distal end of said other operating rod is receivable in said recess.

* * * * *